United States Patent [19]

Kahn

[11] 3,859,403

[45] Jan. 7, 1975

[54] PROCESS FOR SEMICONDUCTIVE CERAMIC BODY

[75] Inventor: Manfred Kahn, Williamstown, Mass.

[73] Assignee: Sprague Electric Company, North Adams, Mass.

[22] Filed: Apr. 13, 1970

[21] Appl. No.: 28,143

[52] U.S. Cl............... 264/56, 106/39, 252/63.2, 252/63.5, 264/61, 264/65
[51] Int. Cl............................................. C04b 33/32
[58] Field of Search ............... 264/65, 56; 106/39; 252/62.3 BT, 63.2, 63.5

[56] References Cited
UNITED STATES PATENTS

| | | | |
|---|---|---|---|
| 2,696,651 | 12/1954 | Gravley | 264/65 |
| 3,028,248 | 4/1962 | Glaister | 264/65 |
| 3,292,062 | 12/1966 | Gallagher et al. | 252/63.5 |
| 3,316,184 | 4/1967 | Nagase et al. | 252/62.3 |
| 3,473,958 | 10/1969 | Waku | 106/39 |
| 3,490,927 | 1/1970 | Kahn et al. | 106/39 |
| 3,523,028 | 8/1970 | Prokopowicz | 106/39 |
| 3,533,966 | 10/1970 | Moratis | 106/39 |
| 3,586,642 | 6/1971 | Matsuo et al. | 106/39 |

FOREIGN PATENTS OR APPLICATIONS 826,143   12/1959   Great Britain........................ 106/39

Primary Examiner—Donald J. Arnold
Assistant Examiner—John Parrish
Attorney, Agent, or Firm—Connolly and Hutz

[57] ABSTRACT

The process involves heat treating a ceramic body, doped for semiconductivity, in an atmosphere containing a partial pressure of oxygen, equal to or less than that of air, at a temperature and for a time sufficient to achieve full secondary crystallization. Thereafter, heat treating said body at an oxygen pressure higher than the partial pressure of oxygen in air, at that temperature within 2,100°F.–2,800°F. and for a time which will yield a body having maximum grain boundary oxidation with the least oxygen penetration into the bulk, as indicated by its most pronounced temperature dependence of resistance.

3 Claims, No Drawings

PROCESS FOR SEMICONDUCTIVE CERAMIC BODY

BACKGROUND OF THE INVENTION

This invention relates to a process for forming a ceramic body and more particularly to a process for forming a semiconductive ceramic titanate body having a resistance which rises rapidly with temperature.

The optimum high positive temperature coefficient of resistance (PTCR) effect is achieved by having a non-equilibrium in the ceramic. To obtain maximum conductivity below the Curie point one does not want an oxygen excess in the bulk or body of the grains of the ceramic. To obtain the maximum PTCR effect it is necessary to insure as much oxidation as possible in the grain boundary regions.

Prior art investigators, in order to obtain an optimum PTCR effect, have, during the formation of the ceramic, made changes in the oxygen pressure of the firing atmosphere without regard to the importance of temperature, crystalline condition and cooling rates as significant variables. This has resulted in obtaining a lesser degree of resistance increase or a higher room temperature resistance than is desirable.

SUMMARY OF THE INVENTION

The present invention involves preparing a semiconductive titanate body having a high PTCR effect by preparing a titanate powder containing a dopant in an amount sufficient to impart semiconductivity thereto but insufficient to inhibit grain growth during firing; forming the powder into a coherent body; heat treating the body to a temperature and for a time sufficient to attain maximum grain boundary oxidation with a minimum of oxygen diffusion into the lattice as indicated by said body having its most pronounced temperature dependence of resistance; and cooling the body at a substantially uniform rate within the range of 500°F./hour to 50°F./hour to at least 300°F.

In a preferred embodiment of the invention, the heat treating is carried out in two stages. The first stage is in a first atmosphere containing a partial pressure of oxygen which is equal to or less than that of air under standard conditions, at a temperature and for a time sufficient to just achieve full secondary recrystallization. The second stage is in a second oxygen-containing atmosphere having an oxygen pressure greater than the partial pressure of oxygen in air under standard conditions, at a temperature within about 2,100°F.–2,800°F. and for a time sufficient to attain maximum grain boundary oxidation with a minimum of oxygen diffusion into the lattice as indicated by said body having its most pronounced temperature dependence of resistance.

DETAILED DESCRIPTION OF THE INVENTION

As employed herein, the language "full secondary recrystallization" refers to the phenomenon whereby some small fraction of the ceramic grains grow to a large size, consuming the more or less small grain size matrix completely. See Introduction to Ceramics, by Kingery, John Wiley & Sons, Inc., New York, 1960, pages 363 and 364.

The starting materials employed herein include broadly the titanates, e.g. barium titanate, barium strontium, titanate, barium lead titanate, etc. This material may be unreacted, partially reacted or a fully reacted titanate. The grain size prior to attainment of full secondary crystallization ranges from 0.07 to 2.5 microns.

The semiconductivity-imparting dopant can be introduced into the starting material by any technique which will uniformly disperse it throughout the starting material. Numerous dopants will impart suitable semiconductivity to the titanate of the present invention. Some known to those skilled in the art are detailed in Saburi, O., "Properties of Semiconducting $BaTiO_3$," Physical Society of Japan 14, (9) 11-59-1174 (1959). Specific examples of suitable dopants are niobium and lanthanum, introduced ultimately in their oxide form. The amount of dopant introduced must be sufficient to impart semiconductivity of the fired body, i.e. give it a resistivity of from 1 to 1,000 ohm-cm., however, it must not be so great as to inhibit the grain growth of the ceramic, preventing full secondary recrystallization. Generally the dopant oxide will be present in from 0.05 to 0.18 wt. % of the ceramic body.

The ceramic body may be compacted into any desired form by any compaction means, e.g., uniaxial pressure or hydrostatic pressure.

In order to retain the conductivity of the titanate imparted to it by the dopant, it is necessary during the first heat treating step to control the oxygen pressure to that within a definite range. Too high an oxygen pressure during this heat treatment step, when grain growth is occurring, tends to lower the conductivity in the bulk of the titanate. This first heat treating step, calculated to effect full secondary recrystallization, peaks broadly within the range of 2,430°F. to 2,550°F. The oxygen pressure during this treatment ranges from equal to the partial pressure of oxygen in air under standard conditions, i.e. 0.2 atmosphere at 68°F. at 760mm. pressure, to a partial pressure of less than this, but not so low as to create a substantial degree of anion vacancies in the ceramic. As a rough indication of a typical lower limit for the oxygen pressure, the figure of 1/10,000 of the oxygen pressure of air under standard conditions may be used. Preferably 0.01 atmosphere of oxygen is employed.

After full secondary recrystallization under these conditions has been achieved, the ceramic body is heat treated in a second oxygen-containing atmosphere. Due to the fact that the diffusivity of oxygen in the grain boundaries is much higher than that in the bulk of the grains, this oxidation treatment affects mainly the grain boundary regions. Excess oxygen in the grain boundaries is necessary to obtain the PTCR effect.

The treatment temperature is within about 2,100°F.–2,800°F. The oxygen pressure is greater than the partial oxygen pressure in air under standard conditions, i.e. 0.2 atmosphere, and can range up to about 5 atmospheres of pressure. This treatment is carried out for a time sufficient to yield a body having the most grain boundary oxidation that can be attained without introducing excess oxygen into the bulk. This will result in a material having the most pronounced temperature dependence of resistance. This "most pronounced temperature dependence of resistance" can be routinely determined by observing the degree of change in resistance versus temperature.

The final step in the process involves gradually cooling at a rate of from 500°F./hour to 50°F./hour down to at least about 300°F., and preferably room temperature, in the same atmosphere as employed during the second heat treatment.

For purposes of comparison, PTCR bodies were formed as follows:

EXAMPLE 1

0.11 weight percent niobium pentoxide was added to $BaTiO_3$ powder. This mixture was milled and pressed into 9/16-inch diameter, 25 mil thick discs. Five such discs were heated in a 100% nitrogen atmopshere at the rate of 350°F./hour to 2,550°F., which is about 80°F. above the temperature at which secondary recrystallization was complete. Immediately thereafter, the nitrogen atmosphere was changed to 100% oxygen and held at 2,550°F. for 1 hour. Thereafter, the discs were cooled in this atmosphere at the rate of 150°F./hour.

EXAMPLE 2

Using exactly the same starting materials, five more discs of the same size were heated in air at the rate of 350°F./hour to a peak temperature of 2,550°F. which is about 80°F. above the temperature at which secondary recrystallization was complete. At this temperature the air atmosphere was exchanged for 100% oxygen at standard pressure and the temperature held at this point for 1 hour. Thereafter, the discs were cooled in this atmosphere at the rate of 150°F./hour.

EXAMPLE 3

Using exactly the same starting materials, five more discs of the same size were heated in air at the rate of 350°F./hour to a peak temperature of 2,470°F. At this temperature secondary recrystallization was just complete, with large crystals, 10μm and larger, extending throughout essentially the whole of the ceramic bodies. At this temperature, the air atmosphere was exchanged for 100% oxygen at standard pressure and the temperature held at 2,470°F. for 1 hour. Thereafter, the discs were cooled in this atmosphere at the rate of 150°F./hour.

EXAMPLE 4

Again using the same starting material, five more discs of the same size were heated in an atmosphere of 1% oxygen and 99% nitrogen at a rate of 350°F./hour to a peak temperature of 2,470°F. At this temperature, secondary recrystallization was just complete. At this point the atmosphere was changed to 100% oxygen at standard pressure and held at 2,470°F. for 1 hour. Thereafter, the discs were cooled in this atmosphere at the rate of 150°F./hour.

EXAMPLE 5

Using the same starting materials, five more discs of the same size were heated in air at the rate of 350°F./hour to a peak temperature of 2,550°F. This temperature is about 80°F. above the temperature at which secondary recrystallization was complete. At this temperature the air was changed for 100% oxygen at standard pressure and the temperature held at this point for 1 hour. Thereafter, the discs were cooled at the rate of 6,000°F./hour.

Gallium-indium electrodes were applied on opposite surfaces of all of the discs of the five examples. Resistance was measured for each disc over the temperature range of 25°C. to 150°C. The resistances of the discs of each example was averaged at each reading point. Though each group had a different resistance, the form of each curve was generally the same, that is, the resistance of each group remained substantially constant from 25°C. to about 110°C. and then rose rapidly.

The following table for each example shows the first firing atmosphere, the temperature of introduction of the high oxygen pressure atmosphere, the rate of cooling, the resistance at 25°C., the resistance at 150°C. and the resistance ratio.

Table

| Example | 1st Atmosphere | °F. of High $O_2$ | °F./hr. of Cooling | R25°C. (ohms) | R150°C. (ohms) | R150°C. / R25°C. |
|---|---|---|---|---|---|---|
| 1 | $N_2$ | 2550 | 150 | 100 | 150K | 1,500 |
| 2 | air | 2550 | 150 | 6000 | 12M | 2,000 |
| 3 | air | 2470 | 150 | 1100 | 4M | 3,640 |
| 4 | 1% $O_2$–99% $N_2$ | 2470 | 150 | 300 | 3.8M | 12,600 |
| 5 | air | 2550 | 6000 | 1000 | 200K | 200 |

As shown by the table, the use of a completely oxygen-free atmosphere, during the first firing stage, as in Example 1, results in a considerably lower resistance ratio than the units of Examples 3 and 4 which were treated according to the present invention. Note that in Example 2, through the use of oxygen-containing gases during both heat treatment stages an improved resistance ratio as compared with Example 1 was obtained. This is due to the fact that by the use of the oxygen-containing gases, anion vacancies are minimized. On the other hand, by the use of a peak temperature which is about 80°F. above the temperature of secondary recrystallization, a high resistivity both above and below the Curie point and a lower resistance ratio are obtained; compare Examples 2 and 3. This is a result to be avoided.

The data with respect to Example 3 show that by selecting as the peak temperature, that temperature where secondary recrystallization is just complete, all resistances are lower, and the resistance ratio is considerably better as compared with the data of Example 2.

The data regarding Example 4 show that by having a lesser but controlled amount of oxygen during the first firing stage and in addition, limiting the peak temperature to that where secondary recrystallization is just complete, a considerably lower room temperature resistance results and an extremely high resistance ratio is obtained.

The data regarding Example 5 show the detrimental effect of an excessive cooling rate. Note that the resistance ratio as compared with Example 2 is decreased considerably.

It should be understood that controlled cooling, i.e. a rate broadly within from 500°F./hour to 50°F./hour, will effect an improved PTCR effect in titanate ceramics of the present invention. A preferred cooling rate is from 200°F./hour to 100°F./hour.

EXAMPLE 6

To barium strontium titanate, containing about 30% by weight strontium, substituted for barium, was added 0.115 weight percent $Nb_2O_5$. The material was well mixed and five 9/16-inch diameter discs, 25 mils thick were pressed from it. The discs were heated in air at a rate of 380°F./hour to a temperature of 2,490°F. and held at this temperature for about 10 minutes. At this point secondary recrystallization was complete and large crystals 10$\mu$m and larger pervaded the ceramic discs. The atmosphere was changed to 100% oxygen and the temperature increased at the rate of 380°F./hour to 2,580°F. and held for 3 hours. The units were cooled in the same atmosphere to room temperature at the rate of 150°F./hour.

Gallium-indium electrodes were applied to opposite surfaces of the discs. Resistance was measured over a temperature range of from 30°F. to 300°F. The resistance increased between room temperature and 212°F. by four orders of magnitude.

It is believed that a high ratio of grain boundary to lattice oxygen diffusivities is essential to attain a pronounced PTCR effect. The oxygen diffusivity along the grain boundaries of the donor-doped semiconductive titanate appears to be greatly in excess of the oxygen diffusivity through their lattice, even at temperatures as high as 2,500°F. Anion vacancies induced by previous reduction or by quenched-in high temperature disorder increase the bulk oxygen diffusivity and will have a detrimental effect upon the amplitude of the PTCR effect. To obtain the optimum magnitude and steepness of the PTCR effect the proper grain size, oxygen pressure and cooling rate must be observed.

Since it is obvious that many changes and modifications can be made in the above-described details without departing from the nature and spirit of the invention, it is to be understood that the invention is not limited to said details except as set forth in the appended claims.

What is claimed is:

1. The method of forming a ceramic semiconductive titanate body having a resistance which rises rapidly with temperature comprising: forming a coherent body of titanate powder containing a dopant, said dopant being a member of the group consisting of niobium pentoxide and lanthanum trioxide in from 0.05 to 0.18 percent by weight of said body; heat treating said body in two stages and at substantially uniform rate within the range of 350°F/hour to 380°F/hour, the first stage being in a first oxygen-containing atmosphere having an oxygen pressure that is equal to or less than that of air under standard conditions, said first oxygen-containing atmosphere having at least 1% by volume of oxygen, at a temperature and for a time sufficient to just achieve full secondary recrystallization, and the second stage being in a second oxygen-containing atmosphere having an oxygen pressure greater than the partial pressure of oxygen in air under standard conditions, at approximately the same temperature as used in said first stage but being within about 2100°F-2800°F and for a time sufficient to attain maximum grain boundary oxidation with a minimum of oxygen diffusion into the lattice as indicated by said body having its most pronounced temperature dependence of resistance; and cooling said body in the same atmosphere as employed in said second heat treating stage at a substantially uniform rate within the range of 200°F/hour to 100°F/hour to at least about 300°F.

2. The method of claim 1 wherein said first atmosphere is air under standard conditions and said second atmosphere is 100% oxygen.

3. The method of claim 1 wherein said first atmosphere is 1% oxygen and 99% of an inert gas and said second atmosphere is 100% oxygen.

* * * * *